Feb. 28, 1928. 1,660,949
S. B. WINN
LEG ELEVATING MECHANISM
Filed July 11, 1927 3 Sheets-Sheet 1
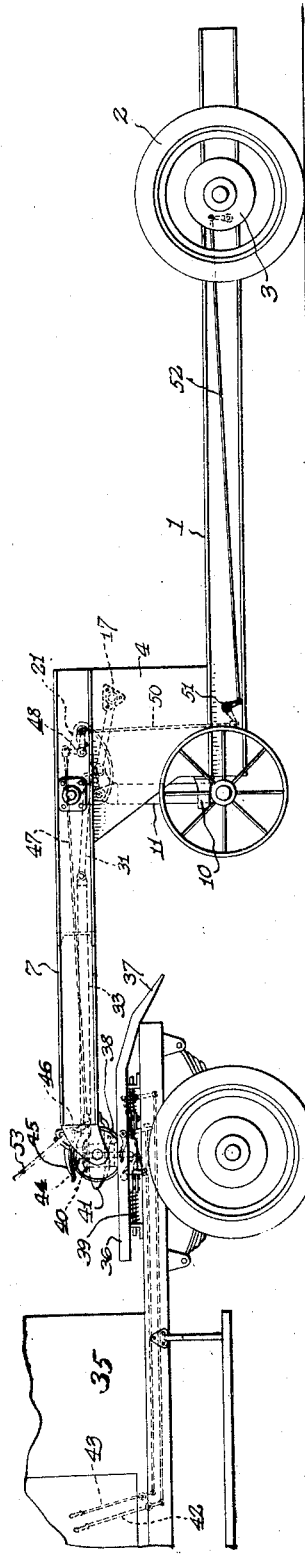
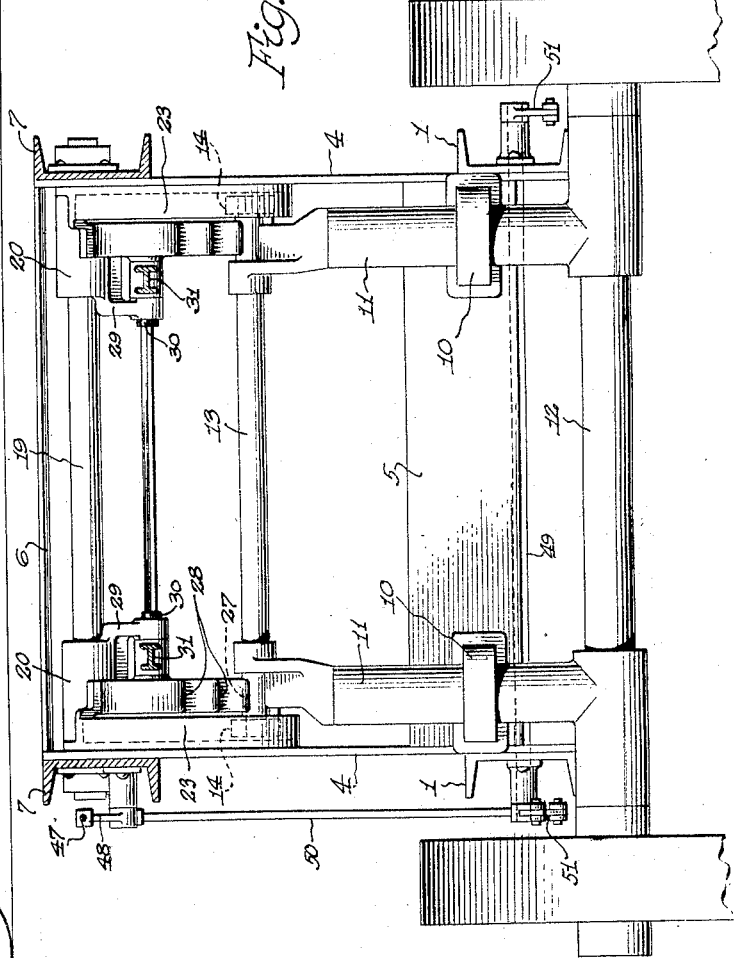
Inventor
Sidney B. Winn,
By
Attorneys Feb. 28, 1928.

S. B. WINN 1,660,949

LEG ELEVATING MECHANISM

Filed July 11, 1927   3 Sheets-Sheet 2

Inventor
Sidney B. Winn,
By
Attorneys

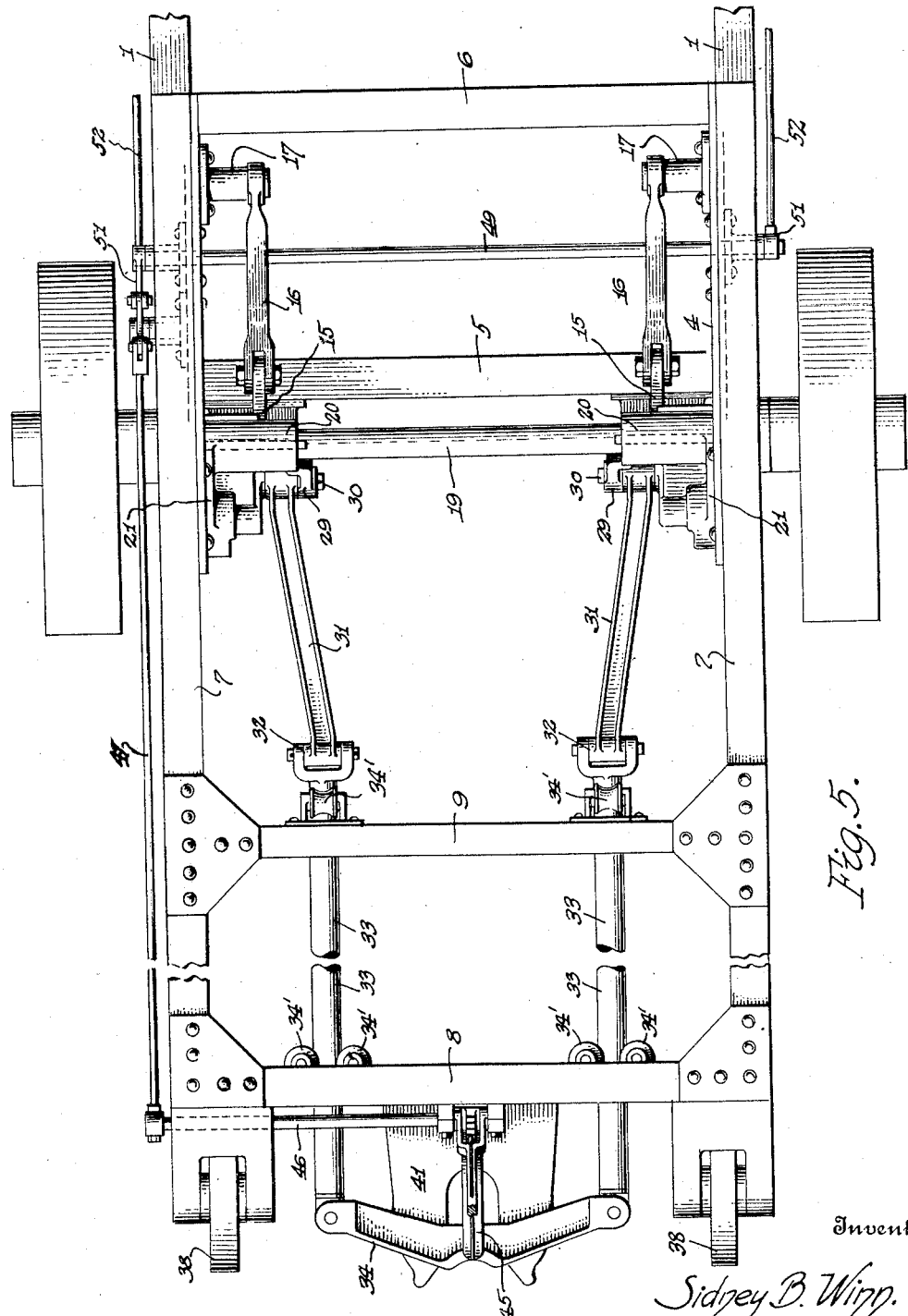

Patented Feb. 28, 1928.

1,660,949

UNITED STATES PATENT OFFICE.

SIDNEY B. WINN, OF LAPEER, MICHIGAN.

LEG-ELEVATING MECHANISM.

Application filed July 11, 1927. Serial No. 204,996.

The tractor trailer art discloses a trailer adapted to have the forward end thereof supported on and coupled to the rear end of a tractor, and the trailer is provided with an adjustable leg structure adapted to condition the trailer for service independent of the tractor. The trailer is equipped with brakes that may be adjusted at will, independent of the tractor or adjusted, at will by the tractor driver during a tractor trailer service condition. Various kinds of mechanism are used for adjusting the trailer leg structure and as an instance of a tractor trailer combination embodying the above features attention is directed to my Patents Nos. 1,548,966; 1,548,967 and 1,548,968 all granted Aug. 11, 1925. In Patent No. 1,548,966 there will be found a shiftable leg structure for the forward end of the trailer and this leg structure is shiftable at an angle to the plane of the trailer chassis with said leg structure arranged in inclined guideways, some of which are notched for a non-slipping engagement with an axle of the leg structure when said leg structure is in an active position sustaining the forward end of the trailer or a load thereon. For shifting the leg structure from an active or lowered position to an inactive or raised position a slide rod is employed and articulated with the leg structure so that said slide rod, which protrudes from the forward end of the trailer, may be actuated by the tractor, when being coupled to the trailer, to raise the leg structure to an inactive position.

The present invention has special reference to a mechanism for raising a trailer leg structure, controlling the lowering movement of the leg structure, and establishing a non-slipping engagement between the leg structure and trailer when the leg structure is in an active load supporting position. The mechanism which I now employ eliminates the angular guideways of my Patent No. 1,548,966, but utilizes an arrangement of notches or seats for insuring a non-slipping connection between the leg structure and the trailer chassis. Instead of shifting the leg structure rearwardly at an angle to the trailer chassis, I provide a leg structure which moves substantially vertically relative to the trailer chassis.

In order that the vertically moving leg structure may have a substantial support relative to the trailer chassis the latter is provided with an intermediate vertical portion to which the leg structure is connected. This intermediate vertical portion of the chassis affords a comparatively low rear chassis frame and an overhanging forward frame by which the forward end of the chassis is connected to the rear end of the tractor. Such a chassis frame is somewhat suggested in my tractor Patent No. 1,564,739 granted Dec. 8, 1925, and my low body tractor trailer combination in Patent No. 1,588,394 granted June 8, 1926. Such a low trailer body or chassis may be used for various purposes, facilitates loading, greater carrying capacity, fewer trailer parts, and greater stability under irregular road conditions.

My invention will be hereinafter described and then claimed, and reference will now be had to the drawings, wherein Figure 1 is a side elevation of a tractor trailer combination in accordance with this invention, the forward part of the tractor being broken away, and the trailer shown in a coupled relation to the tractor;

Fig. 2 is an enlarged vertical cross sectional view of the trailer illustrating the shiftable leg structure in an active trailer supporting position;

Fig. 5 is a plan of the forward end of the trailer shown in Fig. 3.

Figures 3, 4:
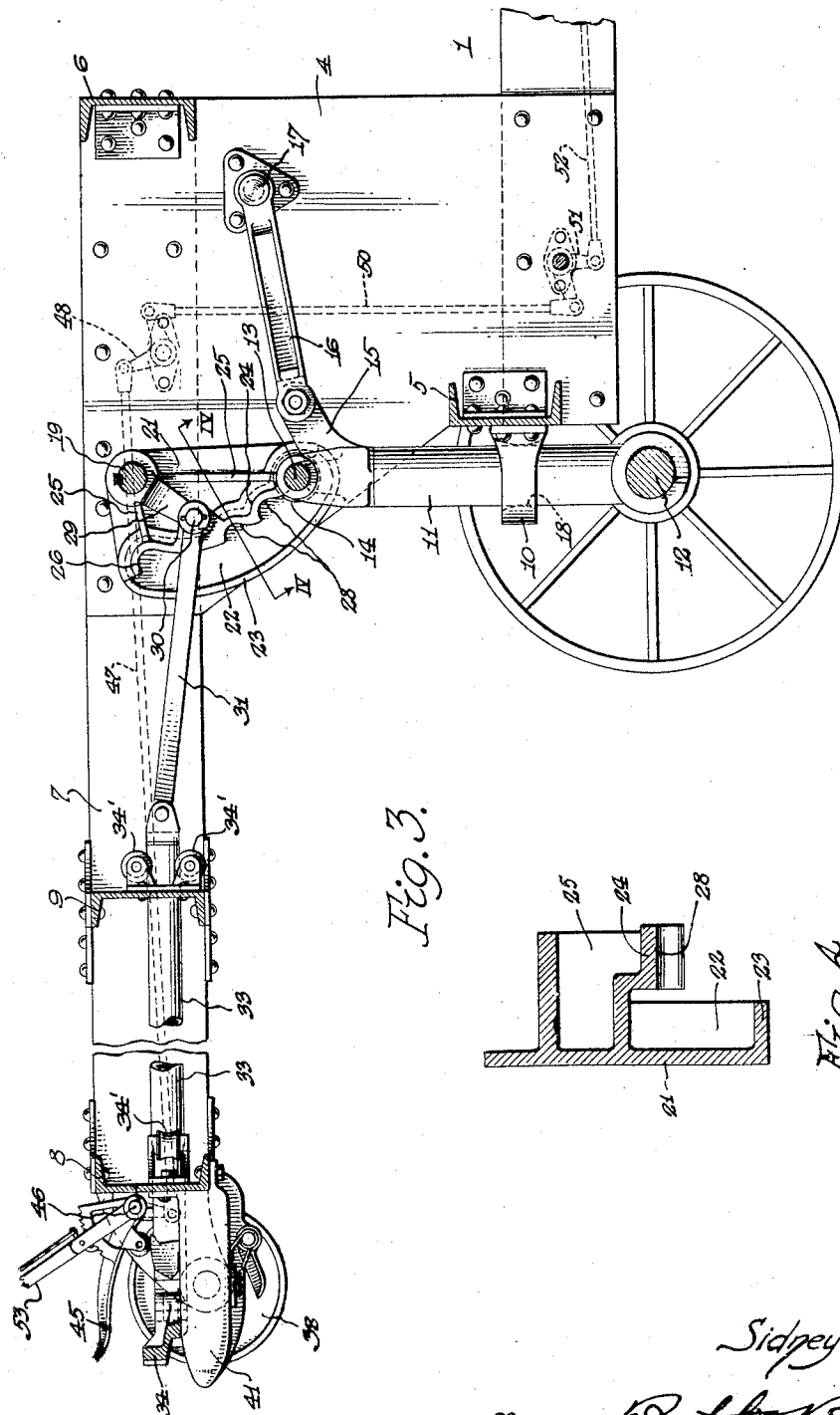
Fig. 3 is a longitudinal sectional view of the forward end of the trailer, partly broken away.
Fig. 4 is a horizontal sectional view taken on the line IV—IV of Fig. 3, showing one of the leg lifting members.

The trailer comprises a chassis having a low rear frame provided with a rear axle assembly 2 which includes a conventional form of brakes, generally designated 3. The forward end of the rear frame 1 has side vertical portions 4 connected by transverse members 5 and 6. Protruding forwardly from the upper ends of the vertical portions 4 is an upper or forward frame 7 including transverse members 8 and 9 with said upper frame constituting an overhanging forward end of the trailer chassis.

On the ends of the transverse member 5 of the trailer chassis are guides 10 for the uprights 11 of a leg structure 12, said leg structure including a wheel equipped axle which will permit of the trailer being moved about when independent of the tractor. The upper ends of the uprights 11 are connected by a transverse axle 13 having its ends provided with rollers 14. Extending rearwardly from the upper ends of the uprights 11 are arms 15 pivotally connected to the forward ends of links 16 which have the rear ends thereof pivotally connected to inwardly projecting bearings 17, carried by the vertical portions 4 of the trailer. The links 16 cooperate with the guides 10 in maintaining the leg structure substantially vertical and since the forward ends of the links 16 are adapted to swing in a slight arc, incident to adjustment of the leg structure, the guides 10 have flared openings 18 to afford clearance for the slight angular or rocking movement of the uprights 11 in said guides.

Connecting the vertical portions 4 of the trailer chassis, above the leg structure, and in the plane of the forward overhanging frame 7 is a transverse rock shaft 19 having its ends journaled in the vertical portions 4 of the trailer chassis. Keyed or otherwise fixed on this transverse rock shaft to rock therewith are the sleeve portions 20 of leg shifting members 21, said members being arranged against the inner sides or confronting faces of the vertical portions 4 of the trailer chassis. Each leg shifting member includes a curved or segmental guideway 22 for the rollers 14 of the leg structure and when said lifting members are swung rearwardly and upwardly, as indicated by dotted lines in Fig. 1, the rollers 14 are adapted to ride on the walls 23 of the guideways 22. Each lifting member also includes a notched portion 24 affording a series of notches to receive an end of the axle 13 and these notched portions are disposed substantially on the same arc as the inner wall of the guideway 22, so that the leg lifting members may seat on the axle 13 of the leg structure and prevent slippage of the trailer chassis relative to the leg structure when said leg structure is in an active chassis sustaining position. The notched portions 24 are braced from the bearings 20 by ribs or webs 25 and each notched portion includes end notches 26 and 27 and intermediate notches 28. The end notches 27, as best shown in Figs. 2 and 3, are adapted to receive the axle 13 when the leg structure is in a lowered active position sustaining the forward end of the trailer independent of the tractor. The other notches 26 and 28 afford seats for the axle 13 when road conditions do not permit of the axle engaging in the notches 27. For instance, the tractor may be on a level below the trailer, on a steep grade, or when the leg structure is lowered it may encounter an elevation between the tractor and the rear end of the trailer. Irrespective of the active position of the leg structure it is bound to find a seat in a set of the notches, and under ordinary operating conditions the set of notches 27 are active in the vertical plane of the leg structure and the rock shaft 19 to cooperate with the links 16 in affording substantial anchorage for the upper end of the leg structure when sustaining the forward end of the trailer independent of the tractor.

The sleeve portions 20 of the leg lifting members are provided with cranks 29 and pivotally mounted between said cranks and the notched portions 24, by pins 30 are connecting links 31 which slightly converge or extend inwardly towards a longitudinal center line of the forward frame 7 of the chassis trailer. The connecting links have the forward ends thereof pivotally connected, as at 32, to a set of parallel slide rods 33 extending through the transverse members 8 and 9 of the frame 7 and supported by anti-frictional rollers 34' carried by said transverse members. See Figs. 3 and 5. The forward ends of the slide rods 33 protrude from the transverse member 8 and are connected by a cross head 34 adapted to be pushed rearwardly to swing the pivotally mounted leg lifting members to cause elevation of the leg structure.

The reference numeral 35 generally denotes a tractor having its rear end provided with a platform or turn-table 36 and inclined ways or a track 37 adapted to receive wheels 38 supported from the transverse member 8, as best shown in Fig. 5. The tractor is adapted to have its rear end backed under the frame 7 of the trailer chassis to raise the forward end of a trailer and place the wheels 38 on the platform 36, whereby the forward end of the trailer will be solely supported on the rear end of the tractor for a combined service. On the rear end of the tractor is a draft appliance 39 provided with a tractor coupling member 40 engageable with a trailer coupling member 41 carried by the transverse member 8 of the trailer. This tractor trailer coupler may be of the form disclosed in some of my prior patents above referred to, but is preferably of that type disclosed in my pending application filed March 13, 1926, Serial No. 94,406, in which the coupler includes jaws that may be locked in closed positions about the tractor coupling member 40, the coupler jaws being controlled from an operating lever 42 on the tractor. The coupler is also preferably of that type which will permit of tractor brake operating mechanism controlling the brakes 3 of the trailer. Preferably such brake mechanism includes a tractor lever 43 and associated parts for raising a pin 44 in the tractor coupling member 40 and said pin is adapted to engage a shoe 45 on a rock shaft 46 supported from the transverse member 8 of the trailer. This rock shaft is connected by a rod 47 to cranks 48 at the rear end of the trailer frame 7, said cranks being mounted on the transverse rock shaft 49 operatively connected by rods 50 to another rock shaft 51 at the forward end of the rear chassis frame 1. This rock shaft is connected by rods 52 to the brakes 3. These connections are best shown in Fig. 1 and a hand lever 53 permits of the trailer brakes being controlled when the trailer is independent of the tractor. For various details of such a brake mechanism reference may be had to my prior patents.

Considering the operation of the tractor trailer combination, and assuming that the trailer is standing alone with its forward end supported by an active position of the leg structure, as shown in Fig. 3, the trailer is conditioned for a backing under movement of the rear end of the tractor 35, because the trailer brakes 3 are ordinarily set so that the trailer cannot back under the influence of the tractor. The brakes are maintained set by the rock shaft 46 being held in a defined position and as the tractor backs under the forward frame 7 of the trailer the trailer wheels 38 encounter the inclined ways 37 and ride up said inclined ways on to the platform 36. As the trailer wheels 38 move forward from the inclined ways 37 the tractor coupling member 40 encounters the cross head 34 and pushes rearwardly on this cross head as the trailer coupling member 40 moves into and is coupled by the trailer coupling member 41. The coupling of the tractor and trailer is automatically accomplished and the trailer brakes released so that there is an operative relation between the tractor and trailer which permits of the former safely handling the latter.

As the cross head 34 is shifted rearwardly by the tractor coupling member 40 the slide rods 33 and the connecting links 31 cause the leg lifting members 21 to be swung rearwardly and upwardly. The initial movement of these members places the walls 23 in engagement with the rollers 14 on the ends of the axle 13. Further movement of the members 21 causes the rollers 14 to roll on the walls 23 in the direction of the notches 26 and this causes the leg structure to be elevated to the position shown in Fig. 1, where the wheels of the leg structure are off of the ground and the trailer is supported by the rear axle assembly 2 and the rear end of the tractor 35.

The leg shifting members swing in an arc of approximately ninety degrees, from substantially vertical depending positions relative to the rock shaft 19, to substantially horizontal positions below and in the rear of the rock shaft. The leg shifting members are retained in such positions by the tractor coupling member 40 bearing against the cross head 34 and coupled to the trailer coupling member 41, so there is no chance whatsoever of the leg structure accidentally descending during a coupled relation of the tractor and trailer.

Assuming that the tractor is to be detached from the trailer, the trailer brakes 3 are set through the medium of the tractor lever 43 and its operating connections which extend through the coupling member 40 of the tractor and along the trailer chassis. The unlocking lever 42 of the coupler is then actuated and the tractor started forward. As this forward tractor movement takes place, the trailer cannot follow because its brakes are set. As the tractor coupler member 40 moves out of and away from the trailer coupling member 41 the cross head follows the tractor coupling member 40. This is because the leg structure 12 is of such weight that it descends by gravity assisted by the act of uncoupling. In doing so the rollers 14 of the axle 13 roll down the walls 23 of the leg shifting members 21 and swing said members to a substantial vertical position. This swinging movement of the leg shifting members causes the cross head 34 to follow the tractor coupling member 40, consequently if the tractor is slowly moved away from the trailer the tractor may control the lowering movement of the leg structure and thus prevent a sudden descent of the same.

Just before the trailer wheels 38 leave the inclined ways 37 of the tractor the wheeled leg structure encounters the ground. Then further lowering of the forward end of the trailer places the notches 27 of the leg shifting members 21 in engagement with the axle 13, thus establishing non-slipping engagement of the leg shifting members 21 with the leg structure in the same vertical plane as the rock shaft 19. It is only necessary to refer to Fig. 3 to note that the leg shifting members serve as interposed props between the top of the leg structure or axle 13 and the rock shaft 19 of the trailer chassis.

Reverting to the elevation of the leg structure by the members 21 it will be noted that the walls 23 have sort of a cam action relative to the rollers 14 of the leg structure, the cam action being such that the upper end of the leg structure must be elevated since the links 16 and the guides 10 confine the leg structure to substantially a vertical movement. The arcuated movement of the forward ends of the links 16 is so slight that shifting of the leg structure from exactly a vertical plane is hardly perceptible, and of course the links cooperate with the guides 10 and the notches portions 24 of the members 21 in affording sufficient rigidity between the leg structure and the trailer chassis to permit of the trailer being moved about, loaded or unloaded, independent of the tractor.

In view of the disclosure in my prior patents mentioned above it is thought unnecessary to enter into other features and advantages of a tractor trailer combination;

this invention being particularly directed to a leg structure body shiftable in substantially a vertical plane, in contradistinction to other types of legs, props or the like, and to the shifting members by which the leg structure is raised and lowered by tractor activities.

The disclosure in this application is suggestive of a rear trailer frame in the same horizontal plane as the forward trailer frame 7, so that one frame is co-extensive with the other to accommodate a long trailer body. For this reason I do not care to confine the present invention to the specific type of trailer chassis shown, and such other changes may be made as are permissible by the appended claims.

What I claim is:—

1. In a tractor trailer combination wherein a tractor is adapted to have its rear end backed under and coupled to the forward end of a trailer, and wherein the trailer has its forward portion provided with an adjustable leg adapted to condition the trailer for service independent of said tractor; leg adjusting means on said trailer, said means comprising a pivoted swingable member over said leg and adapted to raise said leg from an active to an inactive position, and means disposed longitudinally of said trailer and adapted to be actuated by a backing movement of said tractor to swing said member and cause elevation of said leg.

2. A tractor trailer combination as called for in claim 1, and means confining the movement of said leg to a plane substantially vertical to the direction of trailer travel.

3. A trailer adapted for combined service with and separable from a tractor and comprising a chassis, a rear axle assembly for said chassis, an adjustable leg for a forward portion of said trailer, swingable lifting members on said trailer chassis engaging the upper end of said leg, and means at the forward end of said trailer and connected to said lifting members adapted to swing said members and cause elevation of said leg, said means being normally rendered operable by the relative movement of tractor and trailer in the direction of traction.

4. A trailer as called for in claim 3, wherein said means includes a reciprocable member articulated with crank portions of said lifting members.

5. A trailer as called for in claim 3 wherein said lifting members have a configuration adapting said members for a non-slipping engagement with said leg.

6. A trailer comprising a chassis having an intermediate vertical portion, a leg structure slidably supported by the vertical portion of said chassis, swingable lifting members supported from the vertical portion of said chassis and loosely engaging said leg structure so that said members may be swung to lift said structure and then engage said structure to sustain a trailer load, and means connected to said lifting members adapted for swinging said lifting members.

7. A trailer as called for in claim 6, wherein said means includes a set of slide rods carried by said trailer and protruding from the forward end thereof, and a cross head connecting the protruding ends of said slide rods.

8. A trailer as called for in claim 6, and pivoted links and guide members carried by the vertical portion of said trailer for maintaining substantially a vertical movement of said leg structure.

9. A trailer comprising a chassis, a leg structure confined to substantially a vertical movement relative to said chassis, swingable leg lifting members engaging the upper end of said leg structure and adapted to be swung rearwardly and upwardly for lifting said leg structure, and means operatable at an end of said trailer adapted for swinging said lifting members.

10. A trailer as called for in claim 9, wherein said lifting members are pivotally mounted above said leg structure and are interposed between said chassis and said leg structure to maintain said leg structure in a lowered active trailer supporting position.

11. A trailer as called for in claim 9, wherein said lifting members have notched portions engageable with said leg structure to prevent slippage thereof relative to chassis.

12. The combination of a trailer chassis adapted for combined service with and separable from a tractor, a rear axle assembly for the rear end of said chassis, a shiftable leg structure for the forward portion of said chassis, shiftable means interposed between the upper end of said leg structure and said chassis for maintaining said leg structure in an active trailer supporting position, said means having an operative connection with said leg structure for raising the structure bodily in an approximately vertical path to an inactive position, and means on said trailer adapted to be rendered active by relative movement of tractor and trailer in the direction of traction to facilitate shifting the first mentioned means.

13. The combination called for in claim 12, and a rock shaft supporting said shiftable means with the last mentioned means connected to said rock shaft and extending to the forward end of said trailer chassis.

14. The combination of a trailer chassis, a rear axle assembly for the rear end of said chassis, a shiftable leg structure for the forward portion of said chassis, a tractor adapted to be backed relative to said trailer and coupled thereto, and swingable leg lifting members actuated by a backing movement of said tractor adapted to shift said leg structure whereby the forward portion of said trailer chassis is supported wholly by said tractor.

15. The combination called for in claim 14, wherein said swingable leg lifting members have a cam action relative to said leg structure.

16. A trailer comprising a chassis, an axle assembly for the rear end of said chassis, a raisable leg structure for the forward portion of said chassis, a rock shaft carried by said chassis, and means on said rock shaft engageable with the upper end of said leg structure to afford a prop between said rock shaft and said leg structure, said means being swingable to permit of said leg structure being raised.

17. A trailer as called for in claim 16, wherein a connection between said rock shaft means and said leg structure permits of said rock shaft means being utilized to raise said leg structure.

18. A trailer as called for in claim 16, wherein said rock shaft means has a notched configuration to seat on said leg structure and prevent slippage thereof relative to said chassis.

19. A trailer comprising a rear chassis frame, a forward chassis frame, vertical portions connecting said frames and maintaining the rear chassis frame in spaced relation to the forward chassis frame, a rear axle assembly supporting the rear end of said rear chassis frame, a leg structure at said vertical portions connected thereto for vertical movement and adapted when in a lowered active position to support the forward end of said rear chassis frame, spaced apart means connecting said leg structure to said vertical portions, swingable members carried by said vertical portions and connected to said leg structure and adapted when swung to shift said leg structure to a raised inactive position, and means carried by the forward chassis frame adapted for swinging said members to effect a raising movement of said leg structure.

20. A trailer as called for in claim 19, wherein said swingable members have a configuration to seat on said leg structure and support the forward portion of said trailer when said leg structure is in an active lowered position.

21. In a tractor trailer combination wherein a trailer is adapted to have its forward end supported on and coupled to a tractor, a trailer chassis provided with intermediate vertical portions, a rear axle assembly for said trailer chassis, a leg structure intermediate the ends of said trailer chassis adapted for supporting said trailer when independent of the tractor, means connecting said leg structure to the vertical portions of said trailer chassis and confining said leg structure to substantially a vertical movement, a rock shaft carried by said trailer chassis, and means carried by said rock shaft and articulated with the upper end of said leg structure adapted to be swung rearwardly and upwardly to effect a vertical movement of said leg structure relative to said trailer chassis.

22. A tractor trailer combination as called for in claim 21, and means carried by the forward end of said trailer chassis adapted to be actuated by a tractor backing under the trailer chassis for swinging the last mentioned means.

23. A tractor trailer combination as called for in claim 21, wherein said rock shaft means has a cam action relative to said leg structure for raising said leg structure and a seating action on said leg structure for preventing slippage thereof when in a lowered active position.

24. In tractor trailer combinations wherein the tractor and trailer are separable by relative movement in the direction of traction, wherein the forepart of the trailer is supported by the tractor for combined service and supported by a leg structure when tractor and trailer are separated, and wherein the leg structure is inactive when the tractor and trailer are arranged for combined service, a leg structure movable bodily in a substantially vertical path between active and inactive positions, and means adapted to be rendered active by such relative movement of tractor and trailer for shifting the leg structure bodily in such path between such positions, said means being operative to maintain the leg structure in either of a plurality of active positions when out of its inactive position and in a single position when the leg structure is inactive.

25. Means as in claim 24 characterized in that it includes a camming element having a camming surface and a position-retaining formation.

26. Means as in claim 24 characterized in that it includes a pivoted camming element having a camming surface and a position-retaining formation, the movement of the leg structure between its positions being controlled by the pivotal movement of the element.

27. Means as in claim 24 characterized in that such means includes a pivoted camming element having a camming surface and a position-retaining formation, pivotal movements of the camming element being normally limited to periods of relative movement of tractor and trailer in the direction of traction and while the tractor and trailer are in contact during such relative movement.

In testimony whereof I affix my signature.

SIDNEY B. WINN.